United States Patent
Boehm et al.

(10) Patent No.: US 8,102,269 B2
(45) Date of Patent: Jan. 24, 2012

(54) APPROACH WARNING SYSTEM FOR DETECTING WHEN A PERSON APPROACHES AN OBJECT, PARTICULARLY A MACHINE

(75) Inventors: Alfred Boehm, Viechtach (DE); Wilhelm Binder, Tiefenbach (DE); Valeri Keller, Deggendorf (DE)

(73) Assignee: Bartec Benke GmbH, Reinbek/Hamburg (DE)

( * ) Notice: Subject to any disclaimer, the term of this patent is extended or adjusted under 35 U.S.C. 154(b) by 405 days.

(21) Appl. No.: 12/448,430

(22) PCT Filed: Sep. 4, 2007

(86) PCT No.: PCT/EP2007/007704
§ 371 (c)(1),
(2), (4) Date: Jun. 19, 2009

(87) PCT Pub. No.: WO2009/030255
PCT Pub. Date: Mar. 12, 2009

(65) Prior Publication Data
US 2010/0026509 A1 Feb. 4, 2010

(51) Int. Cl.
*G08B 23/00* (2006.01)
*G08B 21/00* (2006.01)
*G08B 13/26* (2006.01)
(52) U.S. Cl. ............ 340/573.4; 340/686.6; 340/426.36; 340/561; 340/562; 324/658; 324/686
(58) Field of Classification Search ............... 340/573.4, 340/686.6
See application file for complete search history.

(56) References Cited

U.S. PATENT DOCUMENTS

| | | | |
|---|---|---|---|
| 5,986,549 A * | 11/1999 | Teodorescu | 340/561 |
| 6,992,565 B1 | 1/2006 | Giesler | |
| 7,245,131 B2 * | 7/2007 | Kurachi et al. | 324/663 |
| 2003/0080755 A1* | 5/2003 | Kobayashi | 324/658 |
| 2006/0063488 A1 | 3/2006 | Hraby et al. | |
| 2008/0191717 A1* | 8/2008 | Gundlach et al. | 324/686 |
| 2009/0066346 A1 | 3/2009 | Kaltner | |

FOREIGN PATENT DOCUMENTS

| | | |
|---|---|---|
| DE | 10 2005 060778 A1 | 6/2007 |
| DE | 10 2006 042547 A1 | 3/2008 |
| EP | 0843425 A2 | 5/1998 |
| WO | WO 96 36134 A1 | 11/1996 |
| WO | WO 0015931 A1 | 3/2000 |
| WO | WO 2004 036784 A1 | 4/2004 |
| WO | WO 2005 088859 A1 | 9/2005 |

* cited by examiner

*Primary Examiner* — Donnie Crosland
(74) *Attorney, Agent, or Firm* — Jacobson Holman PLLC

(57) ABSTRACT

An apparatus relates to an approach warning system for detecting when a person approaches an object which has a metal outer structure at least in regions. The system is formed with at least a first near-field device which is associated with the object and a second near-field device which is associated with the person, wherein the first and the second near-field device form a transmission link for an electric near field, and with a warning device which outputs an approach warning signal when a person with the second near-field device enters a detection region in which a transmission of the near field via the transmission link takes place, wherein the first near-field device is connected, for the purpose of coupling to the near field, firstly to a stray field electrode and secondly to the metal outer structure of the object, so that the outer structure forms a counter-electrode for the stray field electrode, and wherein the near-field devices and the electrodes thereof are configured such that the detection region at least approximately encloses the entire outer structure of the object.

23 Claims, 6 Drawing Sheets

APPROACH WARNING SYSTEM FOR DETECTING WHEN A PERSON APPROACHES AN OBJECT, PARTICULARLY A MACHINE

This is a national stage of PCT/EP07/007704 filed Sep. 4, 2007 and published in German, hereby incorporated by reference.

The invention relates to an approach warning system for detecting when a person approaches an object, particularly a machine, for example an agricultural machine, wherein the object has a metal outer structure, at least in regions.

A number of people are involved in accidents in agricultural operations each year and it is not rare for the accidents to prove fatal. Children are particularly at risk, whereby accidents are frequently caused by children being run over by a tractor or another agricultural machine.

A reason for the accidents may be that children who are in the danger area of the machine when it approaches or is being shunted are overlooked. This may in turn be due to the fact that they are not in the field of view of the driver or the driver must devote his attention to other processes. However, there is also a risk of accidents in the case of other machines and/or vehicles such as fork lift trucks, cars and heavy goods vehicles or with other moving equipment and/or robots if a person enters the danger area.

It is known that a radar system can be used to monitor a danger area, whereby electromagnetic beams are emitted and the signal which is reflected by an object located in the danger area is recognized. Simultaneous monitoring of a large danger area with such a system can, however, be comparatively expensive.

Furthermore, capacitive approach sensors are known wherein a change in capacitance is measured upon approaching an object. In order to secure a large danger area, many approach sensors may hereby be necessary and thus result in great expense.

In the subsequently published German patent application with the reference 10 2006 042 547.2, a system for monitoring a danger area of a machine is described. This system comprises a base unit arranged on the machine, with which a near field is generated in the area of the machine. A person at risk carries or wears a transponder unit which sends a warning signal back to the machine upon receiving the near field. However, this subsequently published German patent application leaves it open how the near field is generated.

WO 00/15931 discloses an electronic communication system for a vehicle with a base station arranged in the vehicle and a mobile data carrier, wherein the base station and the data carrier each have electrodes which form coupling links for transmission of data signals. It can thereby be provided that a coupling link is formed at least partly by the body of a user which guides displacement currents. The system known from WO 00/15931 can for example be used to implement access control to the vehicle, that is to say for automatic locking and unlocking of the vehicle doors. In this case an electrode can be provided in the region of the door handle, whereby a data exchange takes place between the data carrier arranged on the person and the base station arranged on the vehicle for automatic unlocking of the door when the person places his hand on the door handle. An approach warning system is not provided in WO 00/15931.

A further access authorization system is known from WO 2005/088859. This known system can also be used to generate a loss alarm if an object or a person are lost. On the other hand an approach warning system is not described.

WO 96/36134 discloses a system for contact-free detection and signal transmission using the human body as a signal transmission medium. The system can also be used as a position sensor, whereby in this case a plurality of receivers are arranged in the manner of a matrix. On account of the plurality of receivers required, this system is also comparatively expensive.

EP 0 843 425 A2 discloses an electronic communication device which uses the human body as a transmission medium. An approach warning system is not described herein either. An information transmission system using an electric near field is known from WO 2004/036784 A1.

It is an object of the invention to indicate an approach warning system which has a simple structure and is at the same time particularly reliable.

The object is achieved according to the invention by an approach warning system having the features of claim 1. Preferred embodiments are indicated in the dependent claims.

According to the invention an approach warning system is provided for detecting when a person approaches an object which has a metal outer structure at least in regions. The approach warning system according to the invention is designed with at least a first near-field device which is associated with the object and a second near-field device which is associated with the person, wherein the first and the second near-field devices form a transmission link for an electric near field, and with a warning device which outputs an approach warning signal when the person with the second near-field device enters a detection region in which the near field is transmitted via the transmission link, whereby the first near-field device is connected, for the purpose of coupling to the near field, firstly to at least one stray field electrode and secondly to the metal outer structure of the object, so that the outer structure forms a counter-electrode for the stray field electrode, and whereby the near-field devices and the electrodes thereof are configured such that the detection region at least approximately encloses and/or surrounds the entire metal outer structure of the object.

A first core idea of the invention can be seen in that an approach warning system is realized on the basis of an electric near field. For this purpose two near-field devices are used, one of which serves to generate and the other to detect the near field, and one of which is arranged on the machine and the other on the person. According to the invention one of the two near-field devices is thus a near field generator and the other near-field device is a near field detector. If the person approaches the machine, the near field is transmitted between the generator and the detector. Successful transmission and in particular the reaching of a predetermined near-field signal strength are evaluated as entry into the danger area and accordingly a warning signal is output, in particular on the object.

A further aspect of the invention lies in that the near-field devices, particularly the first near-field device associated with the object, and/or the electrodes thereof are configured so that the detection region encloses the entire metal outer structure of the object. In contrast with a known access control system, according to the invention a detection region is not only positioned therefore in the region of the door handles but is instead positioned in the region of the entire metal outer structure, that is to say for example in the region of the entire bodywork. This allows the whole detection region, i.e. in particular the danger area, to be monitored with a particularly small number of near-field devices.

A further aspect of the invention is that, for the purpose of coupling the first near-field device arranged on the object to the electric near field, firstly a stray field electrode and secondly the metal outer structure of the object which forms a counter-electrode for the stray field electrode are used. Accordingly, the first near-field device is line-bound with the stray field electrode and the metal outer structure.

The approach warning system according to the invention is particularly suitable for agricultural machines, wherein it can be used in particular to detect children who are in the danger area of the machine and if appropriate to trigger a corresponding alarm and/or to automatically take corresponding counter measures to avert the danger. The device is also suitable for cars, heavy goods vehicles, with or without trailers, construction equipment such as cranes, fork lift trucks, etc. It can additionally be installed on machines, in particular on stationary machines with mobile elements. This system also allows a fenced-in area to be monitored.

According to the invention a quasi-stationary electric near field is advantageously used. Unlike a far field which decays with $1/r$, such a near field decays suitably with $1/r^2$ or higher powers, meaning that the near field range is generally lower than the far field range. An electric near field according to the invention has the advantage that energy losses are low in comparison with a far field, as a near field does not become detached. It is thus possible to obtain a particularly efficient system. A near field is in particular an electric field which is capacitively coupled and decoupled. For near field generation and/or detection, the near-field devices are preferably designed without antennae.

For quasi-static near field generation the coupling elements of the near-field devices, in particular the coupling electrodes, can appropriately have dimensions which are preferably at least one order of magnitude smaller than the wavelength of the near field. In particular conductor lengths $<\lambda/10$ or $<\lambda/(2\pi)$ can be provided on the coupling elements. In a preferred embodiment of the invention the entire metallically conducting construction is impacted with a quasi-static electric field which lies like an "aura" around this metal structure. If a person with a corresponding near-field detector enters the region of this aura, the aura is detected by the detector and a corresponding warning signal is output.

It has been shown that the location of the near field generation and the location of the near field detection can frequently be exchanged without notable effects, in particular upon the detection region. In particular, it can thus be provided that the near-field device associated with the object is a near-field detector and the near-field device associated with the person is a near-field generator. It is particularly preferred, however, for the first near-field device associated with the object to be the near field generator for generating the near field and for the second near-field device associated with the person to be the near field detector for receiving the near field. With such a preferred arrangement, the signal field strengths arising on the person are reduced and an onboard energy source of the object, for example a vehicle battery, can be used for the operation of the generally comparatively high-resource field generator.

Insofar as in a preferred manner the near field generator is associated with the object, this generator with its electrodes is appropriately configured such that the near field generated at least approximately encloses the outer metal structure of the object. In this case a single transmission device is sufficient for protecting the entire object.

The approach warning system is particularly suitable for monitoring the danger area of vehicles. It is accordingly advantageous for the object to be a vehicle, in particular an agricultural vehicle, for example a tractor, a fork lift truck, a car or a heavy goods vehicle. In particular the vehicle can be an agricultural utility vehicle. The metal outer structure is appropriately the bodywork and/or the chassis of the vehicle. The near-field devices and the electrodes thereof are thus preferably configured such that the detection region and in particular the near field surrounds and at least approximately encloses the entire bodywork of the object, preferably with the chassis.

In order to generate a field distribution which is appropriate in relation to the desired detection region, the stray field electrode is usefully provided outside of the metal outer structure. The stray field electrode is preferably arranged above the roof of the body-work. It is hereby possible to obtain a particularly even field distribution in the danger area.

According to a further preferred embodiment of the invention, the stray field electrode is arranged in a bumper, in particular in a plastic bumper, of the bodywork. This allows the stray field electrode to be arranged in a protected area particularly simply and without change to the air resistance of the vehicle.

In particular for the purpose of homogenizing the field pattern, the first near-field device can also be connected to a plurality of stray field electrodes, of which for example one can be arranged in a front bumper and the other in a rear bumper of the bodywork. In principle it is also possible according to the invention to use a plurality of first near-field devices, of which the stray field electrodes can be provided at different locations in relation to the metal outer structure. This allows differentiation of the direction of the person at risk. Insofar as a plurality of first near-field devices are provided, an essential aspect of the invention remains in that the detection region formed by the devices at least approximately encloses the entire metal outer structure of the object, whereby in particular they generate together a near field which at least approximately encloses the entire metal outer structure of the object.

The stray field electrode can in principle be of different types. However, spherical electrodes have proved to be particularly efficient. Alternatively it can be provided that the stray field electrode is in an elongated form and extends perpendicular to adjacent sections of the metal outer structure. Electrodes arranged perpendicular to each other also generate a good stray field.

With regard to operational safety it is furthermore particularly advantageous that the metal structure can be earthed. Tests have surprisingly shown that the approach warning system based upon near fields can also function upon earthing, which must be due to the impedance of the ground. In particular a near field can also be formed upon earthing of the vehicle below the vehicle.

With more complex objects the metal outer structure can also be in multiple parts. For example it can consist of the chassis and/or bodywork of a traction machine on the one hand and a trailer or tool attached hereto, for example a loading wagon, plough, or liquid manure drum, on the other hand. Insofar as the outer structure is in multiple parts, an electric, for example metallic, coupling is suitably produced between the individual parts, in particular through a releasable electric connection. By means of such an electric connection the near field and/or the detection region can extend to all parts of the outer structure without additional active devices being necessary for this. For example, via the electric connection the near field enclosing the tractor can extend to a trailer. The releasable electric connection can at the same time form a mechanical connection between the parts and for example be formed by the trailer coupling of the tractor. Additionally or alternatively, an electric plug-type connection can also be provided.

Furthermore it is particularly advantageous for the electric near field to be an alternating field. Such an alternating field enables the near-field devices to differentiate the field generated by the near field generator from other fields in a particularly simple way.

An oscillation frequency of the alternating field is preferably in the range from 10 kHz to 10 MHz, in particular from 1 MHz to 5 MHz, whereby 5 MHz is preferred. Tests have shown that a particularly reliable operation of the approach warning system is possible with such field frequencies. In addition, the detectors can be of a particularly simple construction with the aforementioned frequencies.

A particularly simple and reliable approach warning system can be obtained according to the invention in that the alternating field is a continuous (CW) alternating field. This can be understood in particular in that the amplitude and the frequency of the field can no longer be changed after switching-on and possibly an initial adjustment. In particular the alternating field can thus be unmodulated and/or not carry any message-related information content. A continuous alternating field allows particularly high operational safety. According to the invention it can thus be particularly advantageous that no data are transmitted via the near field, the near field thus being data-free following the switching-on process and the near field being used merely to detect an approach and/or to determine the distance. Accordingly the near field according to the invention is not used for information transmission but instead merely to determine the distance between the two near field devices on the basis of the field strength of the near field. It can, however, alternatively be provided that information is formed in the near field so that the detector can for example differentiate different field generators.

The reliability of the system can be increased by the near field detector comprising means for differentiating the near field generated by the near field generator from other fields. This allows erroneous alarms to be avoided which are caused through possibly additionally existing fields. The differentiation means can for example comprise a frequency filter which is adapted to the field frequency of the alternating field. In particular a band pass filter can be provided which can for example be formed as an electric band pass filter and possibly also comprise a mixer for generating an intermediate frequency.

It is further preferred for a decision circuit to be provided which decides, on the basis of a signal strength of the near field existing on the near field detector, on a person approaching the object. This decision circuit is preferably arranged after the differentiation means and/or can be part of the warning device. By reference to the strength of the near-field signal received, it decides whether there is a person approaching and thus a potential danger situation.

The decision circuit can for example comprise a threshold value switch which can trigger an alarm particularly if a threshold value is exceeded. Alternatively or additionally, the decision circuit can be designed to work continuously and also to determine distance information from the signal strength. Particularly for this purpose, the decision circuit can comprise an analogue/digital converter. The decision circuit is preferably arranged at least partially on the near field detector. Additionally or alternatively, however, it can also be associated with the near field generator.

According to a further advantageous embodiment of the invention, the near field detector comprises a radio transmitter and the radio transmitter is designed to change the composition of a radio signal generated by it in dependence upon a signal strength of the near field present on the near field detector. This embodiment allows information concerning an approach which is registered by the near field detector worn by the person to be transmitted by means of the radio signal to the object where a warning signal can then be emitted for example. The radio transmitter is suitably connected to the decision circuit and changes the radio signal in dependence upon the signal strength detected by it which represents a measure for the approach.

The change in composition of the radio signal can for example contain a modulation of the radio signal with information concerning the approach. It can thereby be provided that the radio signal can be changed upon exceeding of a threshold for the near-field signal strength. Additionally or alternatively information concerning the signal strength which is correlated with the distance can be modulated on the radio signal.

It is further useful for the warning device to be arranged at least in parts on the object and to comprise a radio receiver for detecting and/or evaluating the radio signal from the radio transmitter. According to this embodiment information concerning the approach can be transmitted from the near field detector arranged on the person to the object via a radio link, so that there can be a warning of the approach on the object.

Over and above this, it is advantageous for a second radio transmitter to be associated with the object and a second radio receiver to be associated with the person, wherein the second radio receiver preferably comprises means for activating the near field detector upon receipt of a radio signal from the second radio transmitter. An embodiment can thus be provided in which the near field detector associated with the person is formed to be "sleeping" and is only activated upon an approaching of the object by the radio signal of the second radio transmitter. The energy consumption on the near field detector can hereby be reduced. In particular the radio transmitter of the near field detector can also only be activated once a radio signal from the second radio transmitter is received. In order to further reduce the energy consumption, it is advantageous for the second radio transmitter to periodically emit a signal.

The first radio transmitter and the first radio receiver preferably work at a first frequency and the second radio transmitter and the second radio receiver at a second frequency, whereby the two frequencies are usefully different. For example the first frequency can be around 433 MHz and the second frequency around 868 MHz. The first frequency can also be around 868 MHz and the second frequency around 433 MHz. The first radio transmitter associated with the person and the second radio receiver associated with the person can be formed in manner of a transceiver. Likewise, the first radio receiver associated with the object and the second radio transmitter associated with the object can form a transceiver. The radio transmitter and receiver can be designed to exchange information between the object and the person. It can be provided in particular that by means of the second radio transmitter information concerning the identity of the object can be transmitted and/or by means of the first transmitter information concerning the identity of the person can be transmitted. According to the aforementioned embodiment data transmission can take place between the object and the person, in particular via a radio link, wherein the near field can be designed to be data-free and/or information-free. The radio transmitter(s) and receiver(s) are appropriately designed to transmit or receive a far field.

The activation means for the near field detector are preferably periodically switched on and then check whether a radio signal is present. It can be provided in particular that by means of the first radio transmitter a signal is sent back to the object as soon as the second radio receiver receives a radio signal.

On the basis of this signal of the first transmitter a first (preliminary) warning stage can be triggered, even if no near field is yet transmitted. As soon as the near field is detected with sufficient strength the signal of the first transmitter can be changed and a second warning stage can then be triggered. The activation means can for example turn on with a periodicity of milliseconds to seconds.

The near field generator usefully comprises an electric oscillation generator for generating the alternating field. The frequency of this generator can move within the range of a few kHz as far as into the range of a few MHz and preferably lies between 10 kHz and 10 MHz. A range between 1 and 10 MHz is particularly preferred, whereby 5 MHz has proved particularly useful in tests. The near field generator is usefully designed for continuous wave operation, that is to say it works after switching-on and possibly initial adjustment with constant frequency and/or amplitude and/or does not transmit any information.

It is to be observed that the capacitance between the electrode and counter-electrode of the near field generator can change if objects or persons enter the field of the electrodes and/or the dimensions of the electrodes are changed, for example when attaching a trailer to the tractor. Capacitance changes can also arise upon changes in the environmental conditions such as air humidity and/or ground humidity. In order to ensure reliable separation of the alternating field of the near field generator from other fields, it is advantageous for the oscillation frequency of the alternating field to also be kept constant with such changeable capacitances. It is advantageous in particular for the oscillation generator to comprise means for keeping its oscillation frequency constant. These means for keeping the oscillation frequency constant can preferably be designed with changeable electrode capacitance. As a result of the fixed frequency irrespectively of the capacitive factors, the system is very safe, reliable and cost-effective.

It is particularly advantageous for the oscillation generator to be designed to generate a sinus oscillation. In particular, a rectangular oscillation can also be provided for example, but which can be disadvantageous under certain circumstances on account of its harmonics.

In order to increase the reliability and in order to prevent in particular interference effects, it can be advantageous for the oscillation generator to be galvanically insulated from an onboard network of the object, in particular of the vehicle.

It is further advantageous for the oscillation generator to comprise means for setting the oscillation amplitude level. This allows setting of the range of the near field and thus setting of the size of the detection region.

It is further useful for the oscillation generator to comprise means for setting the oscillation frequency. The oscillation generator can hereby be adapted to different near field detectors. By means of the oscillation generator, an alternating voltage is usefully generated which is supplied to the stray field electrode and its counter-electrode formed by the metal structure.

If a person enters the near field generated around the object, the influential electric field brings about displacement currents in the human body and a local field strength increase in the region of the human body can arise. These displacement currents can be detected along the body.

It is particularly advantageous against this background for the second near-field device, for the purpose of coupling to the near field, to firstly be connected to a body electrode associated with the body of the person and secondly to a second electrode at a distance from the body electrode which forms a counter-electrode for the body electrode. Through the close contact between the body electrode and the body of the person provided according to this embodiment, the body of the person itself can serve as a type of antenna, amplifier and/or collector electrode. Measurements have shown that a signal increase by factor 20 or more can be obtained by using a body electrode.

The body electrode is provided according to the invention to be arranged against the human body. The body electrode should be worn or carried as close as possible to the body in order to produce a near field signal that is as large as possible. The body electrode can be provided for a capacitive or for a conductive, that is to say ohmic, contact with the human body, so that it takes up the signal and/or the displacement current in the body capacitively or ohmically.

The use of a body electrode and thus the use of the human body as a "collector electrode" is advantageous from a further viewpoint. Indeed, under certain circumstances, also on account of superposition effects, locally limited error points can arise in the field distribution of the near field. If according to the preferred embodiment the whole body of the person is used as a receiving electrode, a comparatively large electrode is produced which can bridge over the "error points". In addition the influence of such error points is reduced through a relative movement between the object and the person.

The counter-electrode for the body electrode is suitably physically spaced apart from the body electrode and/or electrically insulated from it. The counter-electrode preferably has a different geometry in comparison with the body electrode.

A particularly effective coupling to the body and thus a particularly high sensitivity can be obtained according to the invention in that the body electrode is formed as a ring electrode which is provided in particular to surround the arm or leg of a person. The ring electrode can thereby also be in an interrupted form. It preferably comprises a closure element allowing the ring to be opened for the purpose of attachment or removal.

It has been shown in tests that if the body electrode is arranged in the lower leg region and/or foot region a particularly high signal strength can be obtained. In principle, however, the body electrode can be placed at any point on the body.

The body electrode and/or the counter-electrode of the second near-field device are preferably electrically insulated in relation to the environment in order to avoid undesirable short circuits, in particular when the person moves. The stray field electrode can also be electrically insulated in relation to the environment.

The invention additionally relates to a warning process, wherein an approach warning system according to the invention is provided and by means of the warning device a warning signal is output if a person enters the detection region.

It is an object of the invention to create a system which allows the person to be protected to be provided with a passive detector, with which it can be detected whether the person is in an electric near field. The system is thereby stimulated via a frequency in such a way that the detector can selectively recognize whether a detected field is a field pointing to danger. A near field is thereby used as the electric field, whereby it is ensured that the range of the field only extends over an area which is closely physically connected to the danger-causing object. The near field thereby forms an aura around the metal object with a variable charge, depending upon how the stray field electrode impacted with alternating voltage is currently charged.

An advantage of the system according to the invention is that any metal coupling, for example a trailer, automatically leads to a widening of the "aura" which thereby merely becomes weaker. A particularly high level of safety is hereby achieved. Reflections can arise particularly in the field of the object which lead to secondary fields, but whereby the secondary fields also contribute to the entire field. It can be affirmed that the generation of a large stray field generally has a positive effect upon the field generation. Unlike the prior art, it is provided in particular according to the invention that the chassis of the object itself is used as an electrode and it is not merely coupled into the chassis.

The invention is explained in greater detail below by reference to preferred embodiments which are shown schematically in the drawings, in which.

Figure 1:
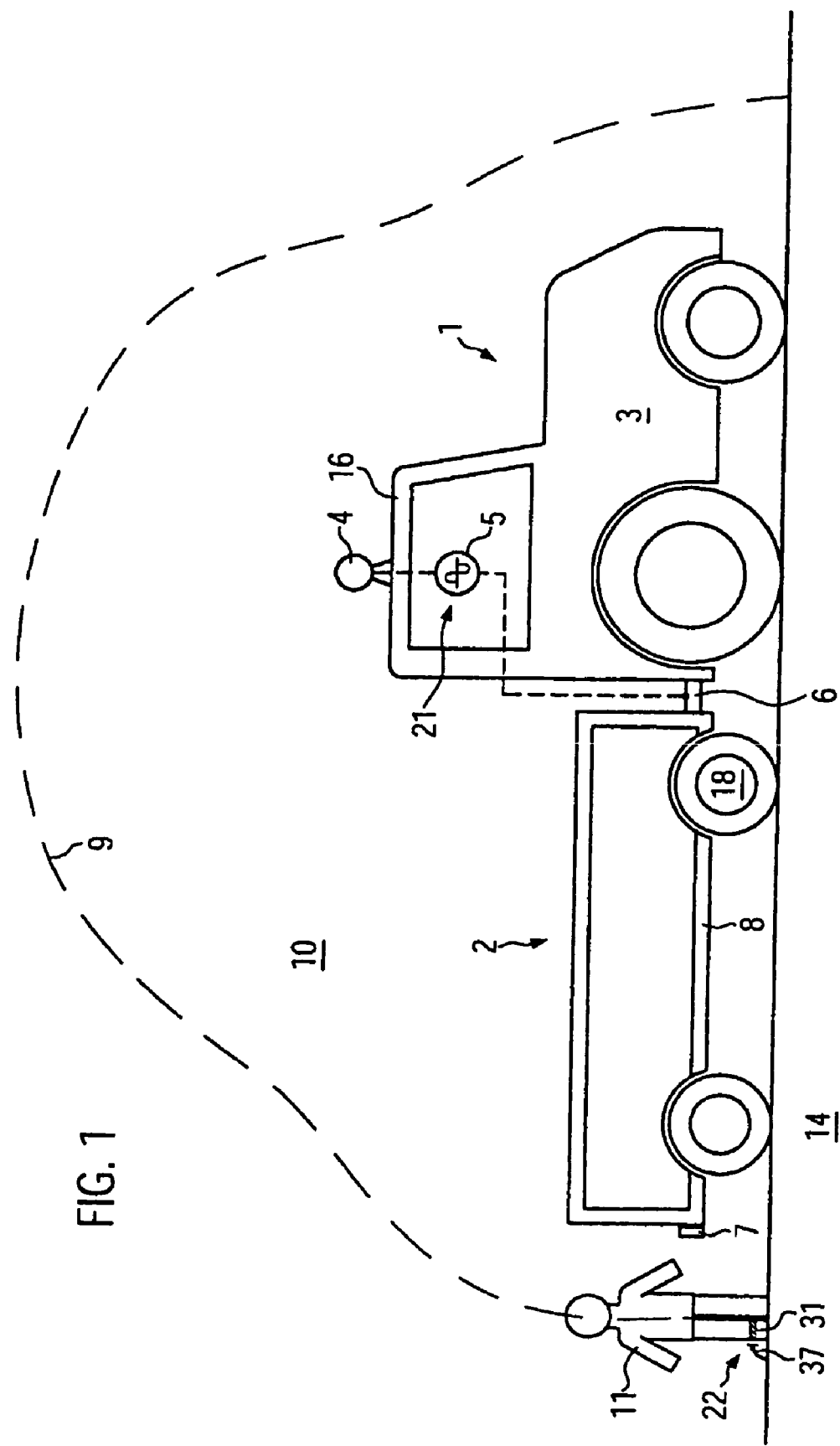
FIG. 1 shows a first embodiment of an approach warning system according to the invention.

A first embodiment of a system according to the invention is shown in FIG. 1. The system shown is provided on an object 1, 2 which is formed by a tractor 1 with an attached trailer 2. The object 1, 2 comprises a metal outer structure 3, 8 which is formed by a metal bodywork with chassis of the tractor 1 and a frame 8 of the trailer 2.

A stray field electrode 4 is provided on the roof 16 of the tractor 1. This stray field electrode 4 is electrically insulated in relation to the bodywork 3 and in relation to a metal chassis of the tractor 1. In the embodiment shown, the stray field electrode 4 is formed as a spherical electrode. In principle, however, it can also be in the form of a flat electrode, conical electrode, etc., whereby it is important that it forms a stray field that is as large as possible for the tractor 1 and its environment.

The stray field electrode 4 is electrically connected to an oscillation generator 5 formed as a frequency generator. The other pole of the oscillation generator 5 is electrically connected to the metal outer structure 3 of the tractor 1. The oscillation generator 5 is thereby part of a first near-field device 21 which is formed as a near field generator.

The metal outer structure 3 of the tractor 1 and the metal outer structure 8 of the trailer 2 are connected to each other via a mechanical coupling 6 which also produces an electrical connection between the outer structures 3 and 8. In the region of this coupling 6 the oscillation generator 5 is connected to the two outer structures 3 and 8. Additionally or alternatively to the coupling 6, an electric plug-type connection (not shown) can be provided between the outer structures 3 and 8. Corresponding power lines can lead for example to a rear reflector 7 and likewise form a counter-electrode for the stray field electrode 4. The rims 18 of the objects 1 and/or 2 can also form, with the corresponding chassis, a counter-electrode to the stray field electrode 4.

A quasi-static electric field forms around the entire object 1, 2, that is to say a near field 10, of which the strength and/or density quickly reduces in an outward direction. By way of example for the near field 10, FIG. 1 shows a line 9 of constant field strength.

The near field 10 also flows through a person to be protected 11 who is in the environment of the object 1, 2 and induces displacement currents in this person which can be detected on a second near-field device 22 formed as a detector which is carried or worn by the person 11.

Figure 2:
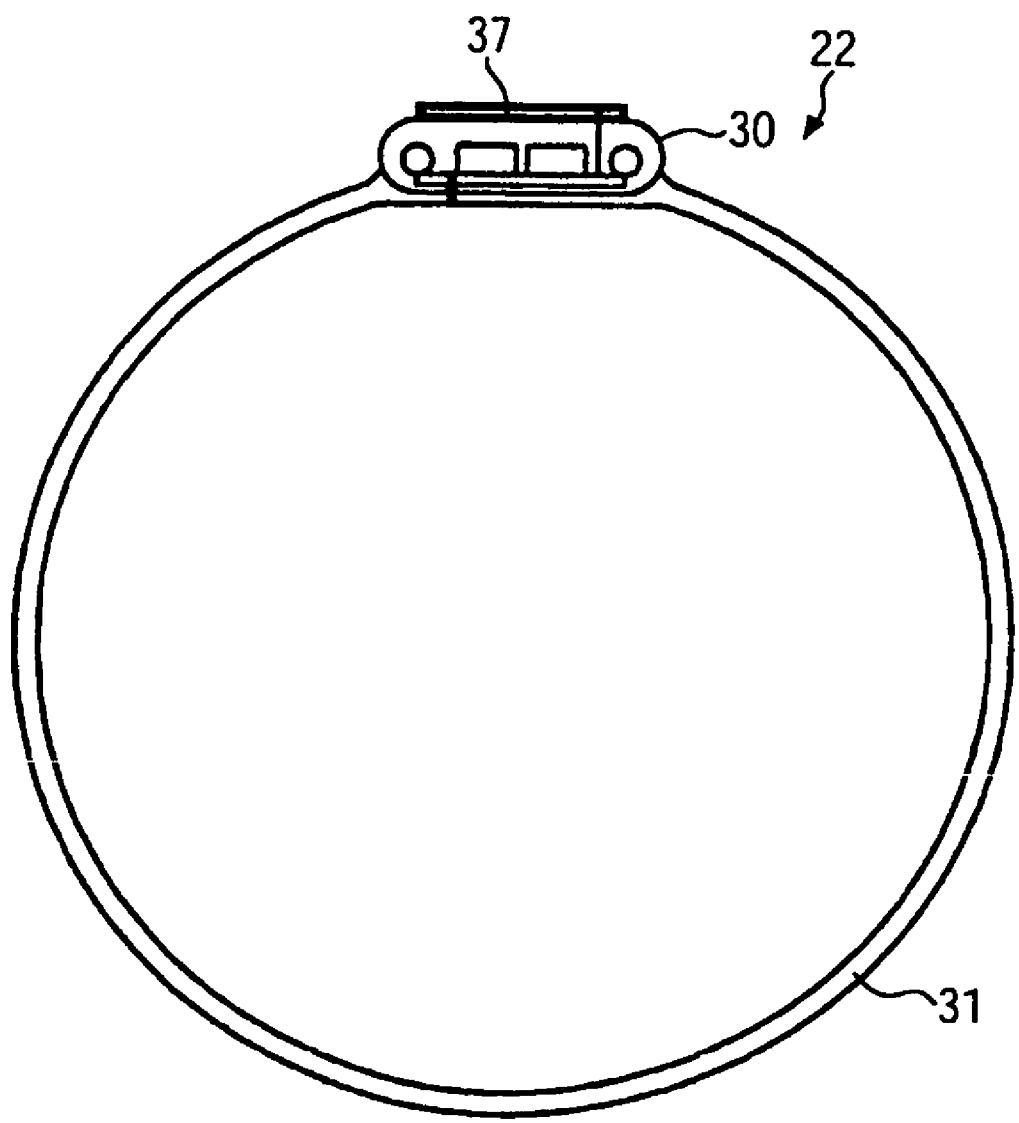
FIG. 2 shows a detailed view of the near field detector of FIG. 1.
Figure 3:
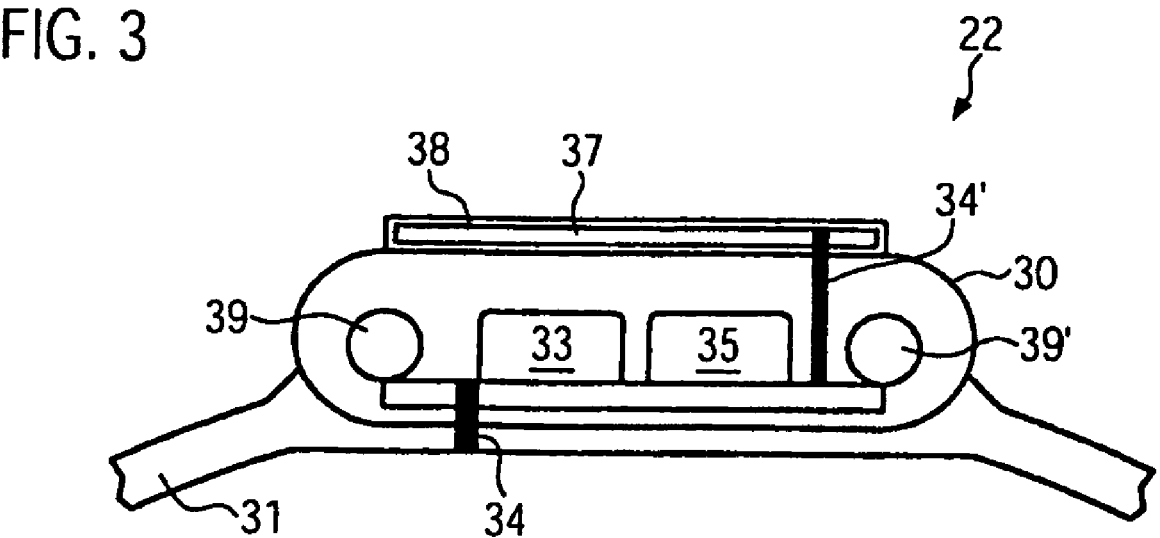
FIG. 3 shows a more extensive detailed view of the near field detector of FIGS. 1 and 2.

The second near-field device 22 is shown in detail in FIGS. 2 and 3. It comprises an annular body electrode 31 which can be placed on the arm or leg of the person 11 and is worn as closely as possible to the body. The body electrode 31 can thereby be capacitively and/or ohmically coupled to the body. Accordingly, the body electrode 31 can be formed so as to be outwardly insulated or conductive.

An insulating housing 30 is provided on the body electrode 31, in which an electronic unit 33 and a battery 35 for supplying the electronic unit 33 are arranged.

On a flat side of the housing 30 facing away from the body electrode 31, a planar counter-electrode 37 is arranged. The counter-electrode 37 consists of metal and can for example be formed by a copper-coated circuit board. An insulation 38 is provided on the surface of the counter-electrode 37. As shown in FIG. 1, this counter-electrode 37 allows a capacitive coupling to earth 14, via which the transmission circuit between the two near-field devices 21, 22 is closed.

In order to produce an electric connection between the electronic unit 33 and the body electrode 31 as well as the counter-electrode 37, contact pins 34 and 34' are arranged in the housing 30, as shown in FIG. 3. In addition, there are two radio antennae 39 and 39' inside the housing 30. These are used to operate a radio transmitter 51 and a radio receiver 54 which are described in greater detail in association with FIG. 6. One of the radio antennae 39 is suitably provided for operation at a frequency of 433 MHz and the other radio antenna 39' for operation at a frequency of 868 MHz.

Figure 4:
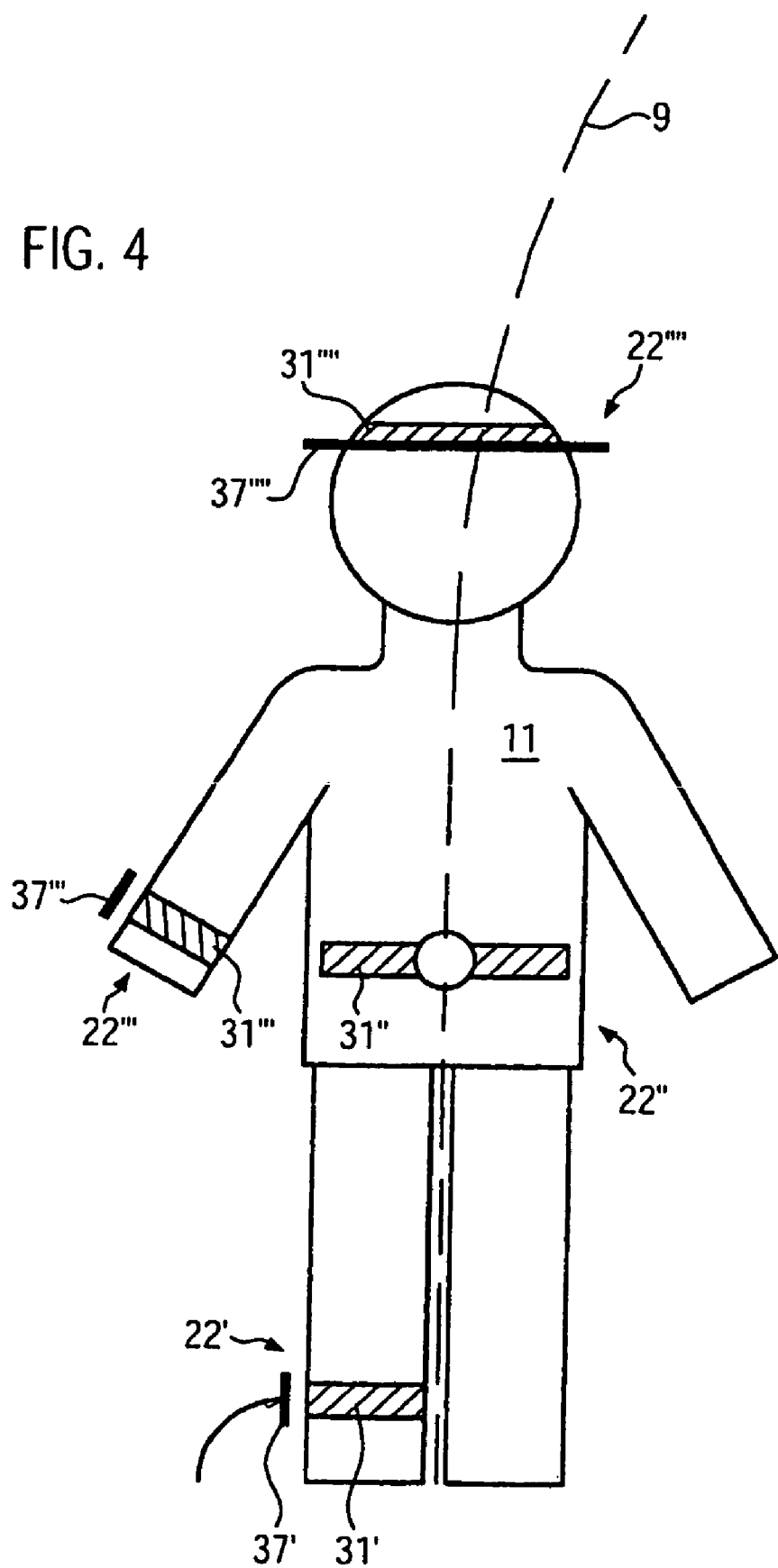
FIG. 4 shows various possible ways of arranging the near field detector of FIGS. 2 and 3 on a person.

FIG. 4 shows different arrangement possibilities of the second near-field device 22, formed as a detector, on the body of the person 11. In the case of the near-field device 22' the associated body electrode 31' is arranged on the leg of the wearer. In the case of the near-field device 22" the body electrode 31" is arranged in the region of the stomach of the wearer. In the case of the near-field device 22''' the body electrode 31''' is arranged on the arm of the wearer. In the case of the near-field device 22'''' the body electrode 31'''' surrounds the head of the wearer in the form of a ring electrode. The counter-electrode 37'''' is hereby in the form of a brim of a hat.

Figure 5:
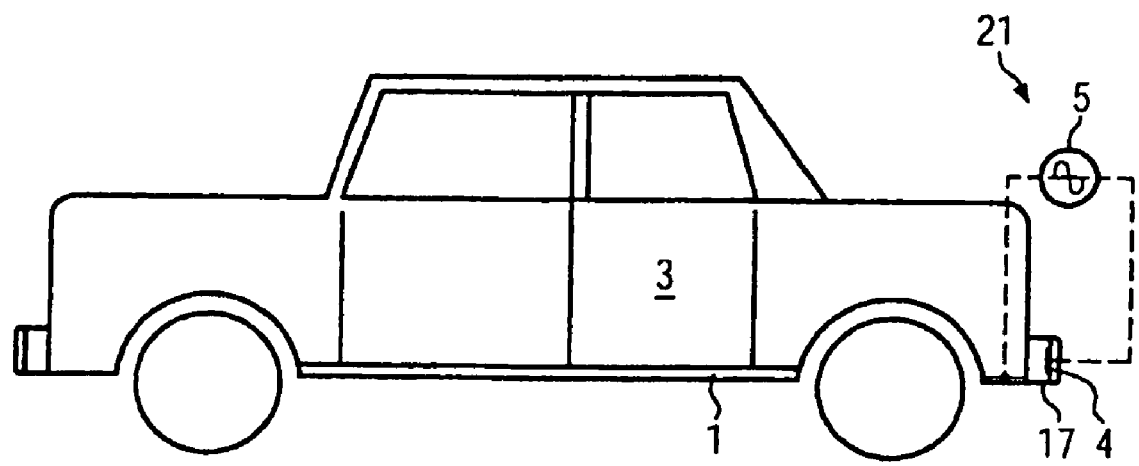
FIG. 5 shows an embodiment of a near field generator for use in a system according to the invention as arranged on a motor car.

A further embodiment for the arrangement of a first near-field device 21 formed as a near field generator is shown in FIG. 5. In the embodiment of FIG. 5 the stray field electrode 4 of the oscillation generator 5 is arranged inside a bumper 17 made of plastic. The metal outer structure 3, that is to say the body, of an object 1 formed as a motor car, is used as the counter-electrode.

Figure 6:
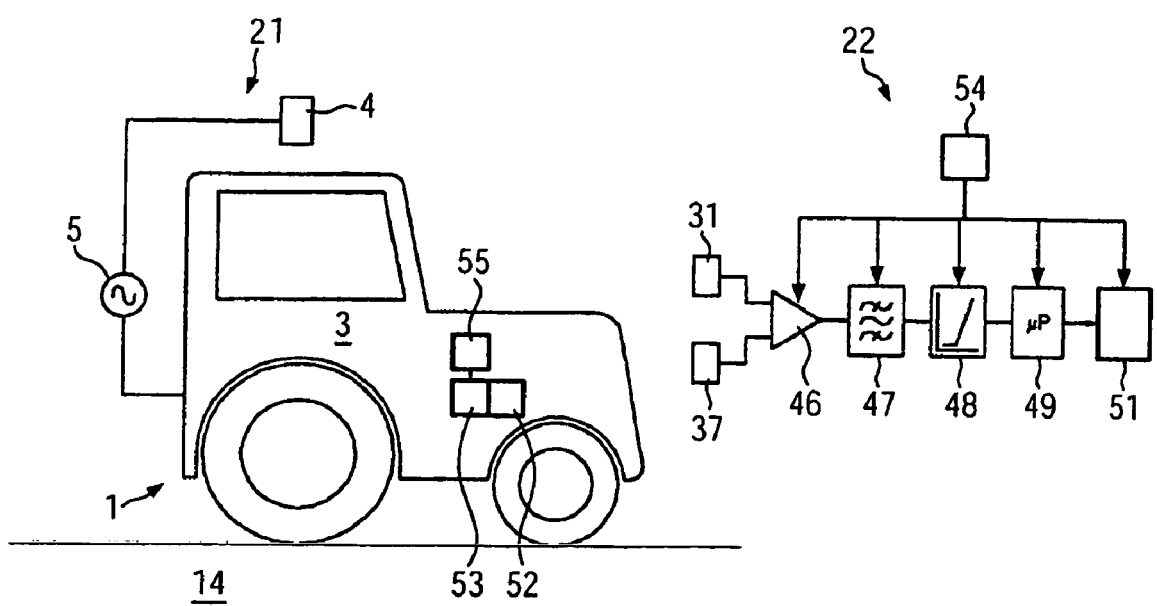
FIG. 6 shows a further embodiment of a system according to the invention with a detailed illustration of the near field detector.

A further embodiment of a system according to the invention is shown in FIG. 6. Similarly to the embodiment of FIG. 1, the embodiment of FIG. 6 also has a first near-field device 21 with an oscillation generator 5 which is connected firstly to a stray field electrode 4 and secondly to the metal outer structure 3 of an object 1 formed as a tractor. The oscillation generator 5 can for example have an operating frequency of 5 MHz and an output voltage of around 0.1 V to around 500 V ($0\,V<U<500\,V$). By means of the first near-field device 21 a near field formed as an alternating field is generated which surrounds the object 1 and defines a detection region for the approach.

The second near-field device 22 to be worn by a person and formed as a detector is shown on the right-hand side in FIG.

6. This second near-field device 22 can in principle also comprise an inverted generator for the purpose of detection.

The body electrode 31 and the counter-electrode 37 of the near-field device 22 which can be used in particular as an earth reference electrode are connected according to the embodiment of FIG. 6 to an amplifier 46. Connected to this amplifier 46 are means 47 formed as a band pass filter for differentiating the near field generated by the oscillation generator 5 from other fields. In turn connected hereto is a decision circuit 48 formed as a threshold value switch which is followed by an electronic evaluation unit 49. A first radio transmitter 51 is in turn arranged on the electronic evaluation unit 49.

If a person and hence the associated second near-field device 22 of FIG. 6 enter the region of the near field of the first near-field device 21, the electrodes 31 and 37 receive the alternating near field. If the body electrode 31 is thereby worn close to the body, the measurement effect can be increased by a considerable factor, for example 90.

The signal of the electrodes 31, 37 is amplified in the amplifier 46 and fed to the band pass filter 47 which is adapted to the frequency of the oscillation generator 5. The signal of the band pass filter 47 is fed to the threshold value switch 48, of which the output signal is in turn fed to the electronic evaluation unit 49. It is also possible for the signal coming from the band pass filter 47 to be forwarded to an A/D converter and for it to be evaluated in order to determine the distance.

If the threshold of the threshold value switch 48 is exceeded, the first radio transmitter 51 changes the emitted signal. The emitted signal of the first radio transmitter 51 is received by a first radio receiver 53 on the object 1. If the signal received indicates that the threshold value has been exceeded and thus a person is approaching, a warning device 55 provided on the object 1 and coupled to the first radio receiver 53 outputs a warning signal.

A second radio transmitter 52 is additionally provided on the object 1. A corresponding second radio receiver 54 is arranged on the second near-field device 22. The second radio receiver 54 is thereby designed so that it only activates the devices 46, 47, 48, 49 and/or 51 once it receives a radio signal from the second radio transmitter 52.

The invention claimed is:

1. Approach warning system for detecting when a person approaches an object, in particular a machine, which has a metal outer structure at least in regions, comprising
at least a first near-field device which is associated with the object and a second near-field device which is associated with the person, wherein the first and the second near-field device form a transmission link for an electric near field, and
a warning device which outputs an approach warning signal if the person with the second near-field device enters a detection region in which a transmission of the near field via the transmission link takes place,
wherein the first near-field device, for the purpose of coupling to the near field, is connected firstly to at least one stray field electrode and secondly to the metal outer structure of the object, so that the outer structure forms a counter-electrode for the stray field electrode, and
wherein the near-field devices and the electrodes thereof are configured so that the detection region at least approximately encloses the entire metal outer structure of the object.

2. Approach warning system according to claim 1, wherein
the first near-field device associated with the object is a near field generator for generating the near field and
the second near-field device associated with the person is a near field detector for receiving the near field.

3. Approach warning system according to claim 1, wherein
the object is a vehicle, in particular an agricultural vehicle, and the metal outer structure is a bodywork of the vehicle.

4. Approach warning system according to claim 2, wherein
the stray field electrode is arranged above a roof of the bodywork.

5. Approach warning system according to claim 2, wherein
the stray field electrode is arranged in a bumper of the bodywork.

6. Approach warning system according to one claim 1, wherein
the stray field electrode is in the form of a spherical electrode.

7. Approach warning system according to claim 1, wherein
the metal outer structure can be earthed.

8. Approach warning system according to claim 1, wherein
the metal outer structure is formed in multiple parts, wherein between the individual parts an electric, for example metal, coupling is produced, in particular through a releasable electric connection, for example a plug-type connection.

9. Approach warning system according to claim 1, wherein
the electric near field is an alternating field,
wherein an oscillation frequency of the alternating field preferably lies in the range from 10 kHz to 10 MHz, in particular being around 5 MHz.

10. Approach warning system according to claim 9, wherein
the alternating field is a continuous (CW) alternating field.

11. Approach warning system according to claim 2, wherein
the near field detector comprises means, in particular a band pass filter for differentiating the near field generated by the near field generator from other fields, and
connected after the differentiating means is a decision circuit, in particular a threshold value switch, which decides whether a person is approaching the object on the basis of a signal strength of the near field present on the near field detector.

12. Approach warning system according to claim 2, wherein
the near field detector comprises a radio transmitter and the radio transmitter is adapted to change the composition of a radio signal generated by it in dependence upon a signal strength of the near field present on the near field detector.

13. Approach warning system according to claim 12, characterised in that
the warning device is arranged on the object and comprises a radio receiver for detecting and/or evaluating the radio signal from the radio transmitter.

14. Approach warning system according to one of the claim 2, wherein a second radio transmitter is associated with the object and a second radio receiver is associated with the person, wherein the second radio receiver comprises means for activating the near field detector upon receipt of a radio signal from the second radio transmitter.

15. Approach warning system according to claim 2, wherein the near field generator comprises an electric oscillation generator for generating the alternating field, wherein the oscillation generator preferably comprises means for keeping an oscillation frequency constant.

16. Approach warning system according to claim 15, wherein the oscillation generator is adapted to generate a sinus oscillation.

17. Approach warning system according to claim 15, wherein the oscillation generator is galvanically insulated from an onboard network of the object and comprises means for setting an oscillation amplitude level.

18. Approach warning system according to claim 1, wherein the second near-field device, for the purpose of coupling to the near field, is connected firstly to a body electrode associated with the body of the person and secondly to a second electrode at a distance from the body electrode which forms a counter-electrode for the body electrode.

19. Approach warning system according to claim 18, wherein the body electrode is in the form of a ring electrode which is provided in particular to surround an arm or a leg of the person.

20. Approach warning system according to claim 18, wherein the body electrode and the counter-electrode of the second near-field device are electrically insulated in relation to the environment.

21. Warning process, in which an approach warning system according to claim 1 is provided and by means of the warning device a warning signal is output if a person enters the detection region.

22. Approach warning system according to claim 15, wherein the oscillation generator is galvanically insulated from an onboard network of the object and comprises means for setting an oscillation frequency.

23. Approach warning system according to claim 1, wherein the stray field electrode is elongated and extends perpendicular to adjacent sections of the metal outer structure.

* * * * *